Feb. 22, 1966   W. H. COX   3,237,152
PRESSURE COMPENSATED HYDROPHONE WITH CONSTANT STIFFNESS
Filed Nov. 21, 1961   2 Sheets-Sheet 1

INVENTOR.
WILLIAM H. COX
ATTORNEYS

United States Patent Office 3,237,152
Patented Feb. 22, 1966

3,237,152
PRESSURE COMPENSATED HYDROPHONE WITH CONSTANT STIFFNESS
William H. Cox, Beaumont, Tex., assignor to Sun Oil Company, Philadelphia, Pa., a corporation of New Jersey
Filed Nov. 21, 1961, Ser. No. 153,839
7 Claims. (Cl. 340—8)

This invention relates to hydrophones and has particular reference to hydrophones designed for seismographic prospecting operations in which a response is desired to low frequencies ranging upwardly from 20 cycles per second.

Heretofore hydrophones for the detection of pressures due to seismic disturbances have been designed with resonant frequencies above the range of seismic frequencies of interest. In order to overcome response changes with ambient pressure encountered in use (since hydrophones are submerged to various depths in liquid) the effect of depth variations has been "swamped out" by increase of stiffness of springs acting on the movable pressure-responsive elements. This expedient is used in simple hydrophone designs to minimize deflection of the pressure-responsive elements by hydrostatic pressure. More advanced hydrophone designs provide automatic equalization of static pressure inside the hydrophone case through an acoustical low-pass filter. The pressure-responsive element is then not subjected to a static pressure difference. A compressible pressure-relief element must be provided inside the hydrophone case so that the pressure-responsive element will be subjected to an alternating pressure difference at signal frequency. The pressure-relief element is usually an air-filled cavity maintained at ambient pressure by changing its volume. It is possible, however, to hold the active pressure-relief volume constant by supplying air from an acoustically separate compartment to change the pressure. Stiffness will be added to the hydrophone system inversely proportional to incremental compressibility of air in the pressure-relief cavity. Compressibility of air varies inversely with pressure and directly with volume. The pressure relief element will therefore add a stiffness component to the system proportional to the square of ambient pressure if its volume is allowed to change according to the gas compressibility law. It has been, therefore, necessary to use a relatively large fixed spring constant in the pressure-responsive element to minimize the total stiffness change due to ambient pressure. Variation in total stiffness of the pressure-responsive system will change its resonant frequency. As a consequence the frequency and phase response characteristic of the hydrophone will change.

The result of the foregoing involved a great decrease in sensitivity: the total stiffness of the moving system was necessarily accompanied by a corresponding reduction in the mechanical movement per unit pressure change.

In accordance with the present invention a different approach to the problem is provided. Instead of attempting to use spring stiffness to "swamp out" the variations of air stiffness, a very low spring stiffness is provided accompanied by the utilization of an arrangement maintaining the air stiffness substantially constant. The result is the attainment of a system having natural frequency lower than the seismic frequencies of interest, i.e., the natural frequency is 20 cycles per second or less. As will appear below, this result is achieved by maintaining a constant ratio of pressure to volume of the body of air forming an element of the moving system.

The general object of the invention is the provision of a hydrophone of the type just indicated. This object, as well as others relating to details of construction and operation will become apparent from the following description read in conjunction with the accompanying drawing, in which.

There will first be described the construction illustrated in FIGURES 1 and 2, and this will be followed by discussion of the principles involved.

Figures 1, 2:
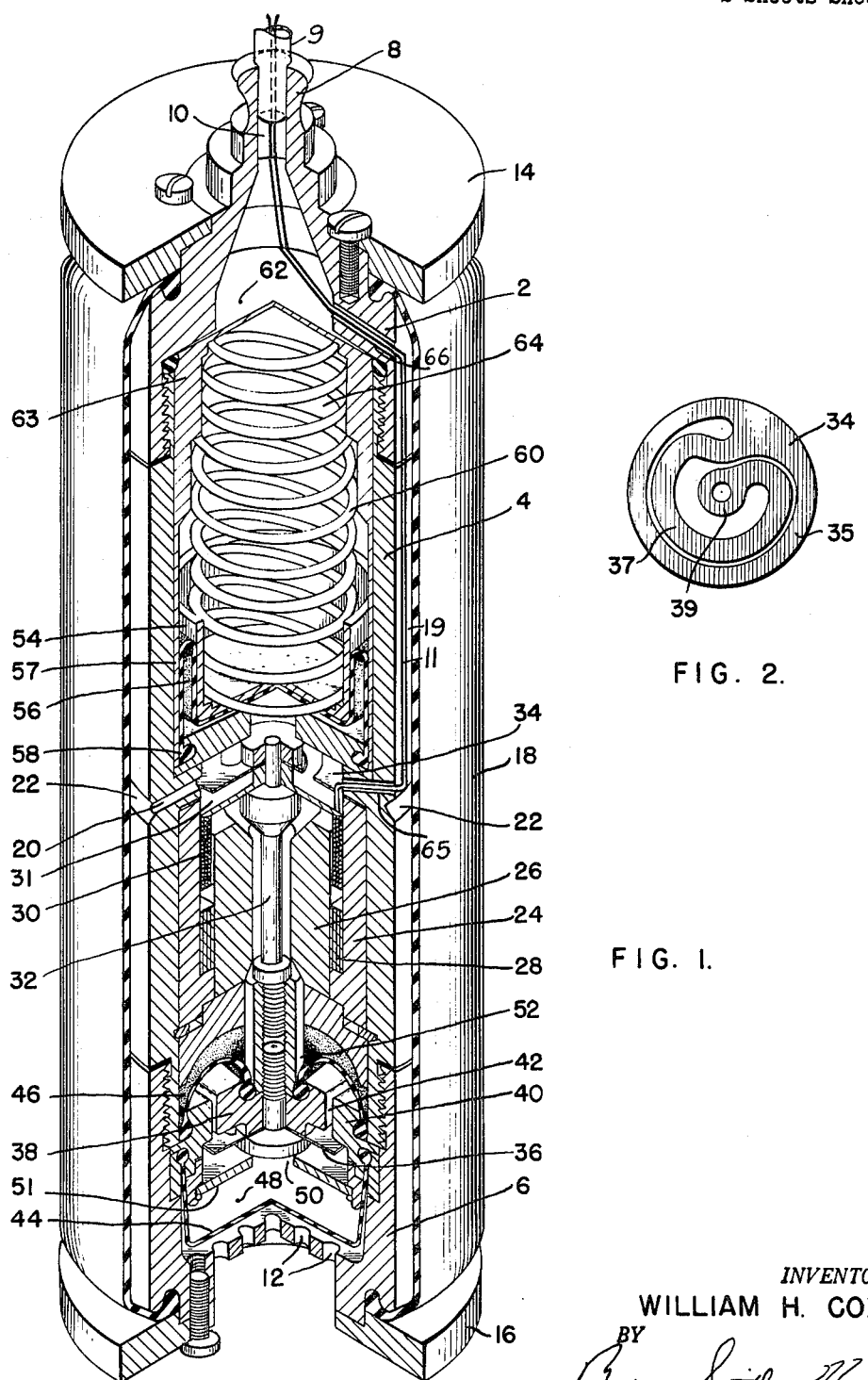
FIGURE 1 is a perspective view, partly in section, showing the construction of a preferred form of hydrophone.
FIGURE 2 is a plan view illustrating a supporting element for the moving system.

A housing is provided by connected rigid elements 2, 4 and 6 assembled by threading in a fashion which will be evident from FIGURE 1. The uppermost element 2 is provided with a bore 10 within an extension 8 for connection to, and passage of, a cable 9 containing electrical conductors 11. The lowermost element 6 is provided with passages 12 for communication between the interior and exterior of the housing.

Cap members 14 and 16 clamp to the exterior of the housing a tubular sack 18 of soft rubber which, having substantial clearance with the exterior of the housing, provides an air chamber 19 of considerable volume subject to external pressures. An orifice of small cross-section indicated at 20 provides communication between the chamber 19 within the sack 18 and the interior of the housing, there being desirably provided a groove 22 in the exterior of the housing at the location of the passage 20 to avoid the possibility of the passage being closed by collapse of the sack. The passage 20 is sufficiently small that static pressure variations are transmitted therethrough; but the pressure variations constituting the signals to which the hydrophone is to respond are effectively attenuated so that their contribution to the interior system is negligible.

A fixed magnetic field is provided by the coaxial fixed elements 24 and 26 which are in contact at their lower ends and provide a gap between their upper ends, one or both of them being permanent magnets. A movable coil 30 is mounted to move in the gap. Below coil 30 there is a non-magnetic filler 28 the purpose of which is to reduce the volume of air surrounding the moving system. Longitudinal motion of coil 30 in the magnetic field produced by elements 24 and 26 causes an electrical current to be induced in coil 30. The combination of elements 24, 26 and coil 30 constitutes a pickup system which provides electrical output signals in response to motion of the coil 30.

The coil 30 is carried by a supporting spider 31 carried by the upper end of a spindle assembly 32, the upper and lower ends of which are mounted in spring elements 34 and 36 which are of the same construction, this being illustrated in FIGURE 2. The element 34 there illustrated is made of thin spring metal such as beryllium copper having a thickness of 0.01 inch, and is formed as a ring 35 clamped in the housing and from which there extends the spiral arm 37 the central portion 39 of which is secured to the spindle assembly. The springs thus formed have very low stiffness, the assembly being made so that neither is substantially strained from its relaxed position. What is here desired is a supporting arrangement which maintains the spindle and coil assembly central against transverse movement but provides very low stiffness against axial movement.

The lower end of the spindle assembly 32 carries a piston 38 which has a cylindrical outer surface having slight clearance with the cylindrical bore of a fixed member 40. The annular clearance 42 is such as to permit restricted passage of oil therethrough, giving rise to a pressure drop proportional to velocity due to viscous drag.

This viscous drag constitutes an acoustical resistance to minimize leakage of sound signal pressure around the piston. Some damping of piston motion is produced by shear resistance of the thin layer of liquid between the piston 38 and the cylindrical bore of fixed member 40.

An oil chamber is provided below the piston by the use of a cap member 44 constituting a slack diaphragm secured at its edges as illustrated in the housing provided by rigid element 6. Soft rubber is here used to provide a diaphragm having very little stiffness.

A somewhat similar slack diaphragm is provided at 46 above the piston, having its outer periphery clamped to the fixed housing and its inner periphery secured to the piston and spindle assembly. All of the space 48 between the two diaphragms is filled with an oil, desirably one having a minimum of viscosity change with temperature. Above the diaphragm 46 is the air chamber 52 which has free communication with all of the air space surrounding the movable spindle assembly 32. Flow of oil through the central opening 50 produces an acoustical mass loading which adds to the mechanical mass to lower the resonant frequency. A fixed diaphragm 51 is desirably provided to add further damping of oil movements, being provided with a restricted central opening 50.

From the foregoing construction it will be evident that a positive pressure change delivered through the openings 12 to the lower side of the diaphragm 44 will produce upward movement of the piston and spindle assembly due to the restricted passage 42, the diaphragm 44 moving upwardly and the diaphragm 46 correspondingly moving upwardly.

As noted in the introduction, it is desired to have the volume of the air surrounding the moving coil assembly bear a constant ratio to the pressure thereof. The air in question is that which is in the volume constituted by the space 52, the passage 53 surrounding the spindle 32, the spaces within which the spider and coil move and the space below the piston 54 about to be described. It will be evident that the pressure of this air must change with the ambient pressure to avoid static changes of the position of the coil assembly, i.e., interior and exterior static pressures must be balanced. The volume of air just described is, of course, in communication with that within the sack 18 through the passage 20, but because of the restriction of this passage only slow (static) conditions of change need be considered.

A piston 54 is in the form of a hollow cup and constitutes the rigid movable member of a diaphragm type device commercially known as a "Bellofram," the piston 54 being associated with a flexible rubber diaphragm of cup shape which freely folds upon itself as illustrated, the diaphragm being indicated at 56 with its outer edge 58 secured in the housing and so arranged as to extend upwardly within a clearance provided between the piston 54 and an outer rigid member 57, being then folded upon itself to extend across the lower face of the piston 54. The clearance between the folds of the diaphragm 56 is somewhat exaggerated in FIGURE 1, these folds actually being close together and the diaphragm being of highly flexible rubber so that if the piston moves up and down the circumferential fold line freely moves to maintain separated the spaces above and below the diaphragm. Free low-friction movement is thus provided with negligible stiffness.

Seated at its lower end in the piston 54 is a spring 60 which bears against the upper end 62 of the enclosure 63. The closed space 64 within this enclosure is evacuated.

A passage 65 is provided in casing element 4 for flexible leads 11 connected to the movable coil 30. A narrow passage 66 is provided in casing element 2 for the passage of flexible leads 11. Leads 11 are disposed longitudinally in chamber 19, and adjacent to the casing elements 2 and 4.

With the space 64 evacuated as stated, the spring 60 is chosen, taking into account the volume of air surrounding the moving coil system, so that as pressure changes are applied to the sack 18 to provide forces acting on the piston 54 the piston may move so that whenever equilibrium is attained between the force exerted downwardly by the spring 60 and the force exerted upwardly on the piston 54, the volume of the entire air space is constantly proportional to the external pressure. With changes of pressure due to lowering or raising of the hydrophone this equilibrium condition is rapidly reached and substantially constantly maintained. It remains now to show that the attainment of this condition is equivalent to the maintenance of the stiffness of the air at a constant value. It may be noted that mechanical stiffness of the system is very low. Mechanical stiffness need only be great enough to limit sag due to weight of the moving parts. Air stiffness is therefore a large part of the total stiffness in the pressure-responsive element. The small proportion of the stiffness added by the mechanical elements, primarily the supporting springs 34 and 36, is substantially constant. It may be noted that the movement of the movable system in response to the pressure changes to be picked up is only of the order of a few thousandths of an inch.

Considering the air, the gas law which is involved is:

$$PV^n = K$$

The constant $n$ for all conditions of operation is effectively an actual constant. If the air cycle involved is considered adiabatic, the constant would be 1.4. However, irrespective of what it is, the following applies:

Taking the derivative of the pressure $P$ with respect to the volume $V$, the following expression is obtained:

$$\frac{dP}{dV} = -n\frac{P}{V}$$

The expression $dP/dV$ is the air stiffness, and it will be noted that if this is to be constant all that is required is that $P/V$ be constant which is the condition imposed by the use of the arrangement which has been described which maintains this ratio constant for changes of pressure, the volume changing by movement of piston 54, in proportion to changes of ambient pressure.

By the foregoing there are eliminated the changes of stiffness of the air which would, if permitted, render the response of the hydrophone variable with the ambient pressure. Because, in the construction described, there is no necessity for swamping out the change of air stiffness by using a large mechanical stiffness, the mechanical stiffness may be substantially removed as a factor of interest (at any rate being constant) and the total stiffness of the moving system may be reduced close to that corresponding to the air stiffness alone. The result is that the natural frequency of the moving system may be reduced below the lowest frequency which is to be detected. The damping which has been described provides for absence of any substantial resonant peak even below the range of frequencies to be picked up. It has been found experimentally that the resonant frequency can be held to a variation of less than one percent down to a depth of seventy feet. Resonant frequency error is limited only by the accuracy to which the parts are constructed.

As previously indicated, sensitivity is greatly increased by the reduction in total stiffness as compared with hydrophones heretofore provided.

Figure 3:
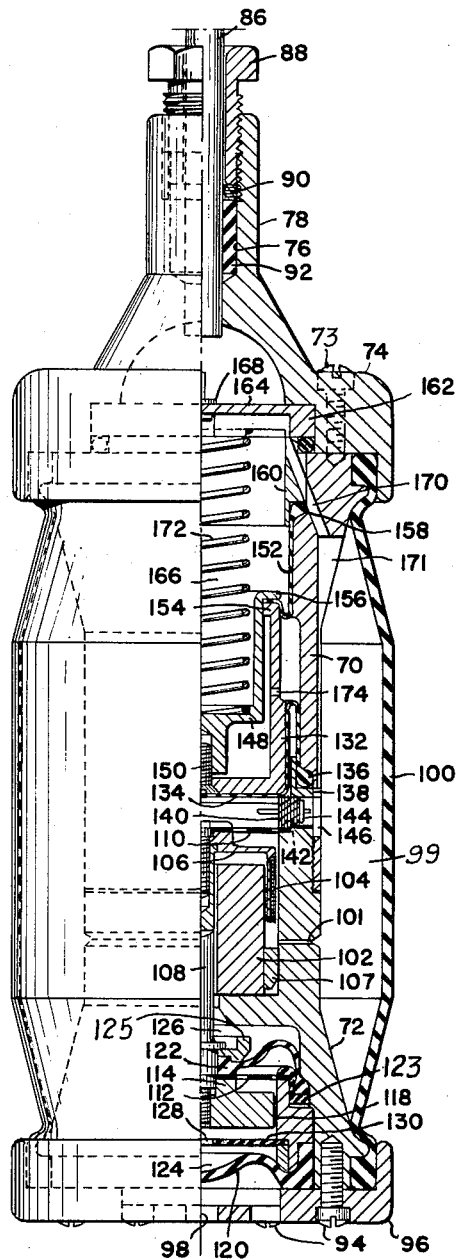
FIGURE 3 is an elevation, partly in section, of another form of hydrophone provided in accordance with the invention.

In the form of the invention shown in FIGURE 3, a housing is provided by connected rigid elements 70 and 72 assembled by threading in a fashion which will be evident from FIGURE 3. The element 70 is suitably connected, as by bolts 73, to a cap member 74 which is provided with a bore 76 within an extension 78 for connection to and passage of a cable 86 connecting electrical conductors running to a pickup coil. Cable 86 is mounted in extension 78 in a well known manner by a nut 88, an annular member 90, and a tubular sealing element 92. The element 72 is connected by bolts 94 to a cap member 96 which is provided with passages 98 for communication between the interior and exterior of the housing.

Cap members 74 and 96 clamp to the exterior of the housing a tubular sack 100 of soft rubber which, having substantial clearance with the exterior of the housing, provides an air chamber 99 of considerable volume subject to external pressures. An orifice of small cross-section indicated at 101 provides communication between the chamber 99 within the sack 100 and the interior of the housing, there being desirably provided a groove in the exterior of the housing at the location of the passage 101 to avoid the possibility of the passage being closed by collapse of the sack. The passage 101 is sufficiently small that static pressure variations are transmitted therethrough; but the pressure variations constituting the signals to which the hydrophone is to respond are effectively attenuated so that their contribution to the interior system is negligible.

A fixed magnetic field is provided by a magnetic element 102 which is concentric with element 72 and is in contact therewith at its lower end to provide a magnetic field with a gap therebetween. A movable coil 104 is mounted to move in the gap. Below this coil there is a non-magnetic filler 107, the purpose of which is to reduce the volume of air surrounding the moving system.

The coil 104 is carried by a supporting spider 106 mounted at the upper end of a spindle assembly 108, the upper and lower ends of which are mounted in spring elements 110 and 112 which are of the same construction as the element 34 shown in FIGURES 1 and 2.

At the lower end of the spindle assembly 108 there is mounted a piston 114 which has a cylindrical outer surface having slight clearance with the cylindrical bore of a fixed member 116. The annular clearance 118 is such as to permit restricted passage of oil therethrough, giving rise to a pressure drop proportional to velocity due to viscous drag. This viscous drag constitutes an acoustical resistance to minimize leakage of sound signal pressure around the piston. Some damping of piston motion is produced by shear resistance of the thin layer of liquid between the piston and cylinder.

An oil chamber is provided below the piston by the use of a cap member 120 constituting a slack diaphragm secured at its edges, as illustrated, to the housing. Soft rubber is here used to provide a diaphragm having very little stiffness.

A somewhat similar slack diaphragm is provided at 122 above the piston, having its outer periphery clamped between clamping member 123 and the fixed housing member 72 and its inner periphery secured to the piston and spindle assembly by means of clamping member 125. All of the space 124 between the two diaphragms is filled with an oil, desirably one having a minimum of viscosity change with temperature. Above the diaphragm 122 is the air chamber 126 which has free communication with all of the air space surrounding the movable piston and spindle assembly. Flow of oil through the central opening 128 in a fixed diaphragm 130 produces an acoustical mass loading which adds to the mechanical mass to lower the resonant frequency. The fixed diaphragm 130 is desirably provided to add further damping of oil movements.

From the foregoing construction it will be evident that a positive pressure change delivered through the openings 98 to the lower side of the diaphragm 120 will produce upward movement of the piston and spindle assembly due to the restricted passage 118, the diaphragm 120 moving upwardly and the diaphragm 122 correspondingly moving upwardly.

As noted in the introduction, it is desired to have the volume of the air surrounding the moving coil assembly bear a constant ratio to the pressure thereof. The air in question is that which is in the volume constituted by the space 126 the passage surrounding the spindle 108, the spaces within which the spider 106 and coil 104 move and the space below the piston 132 about to be described. It will be evident that the pressure of this air must change with the ambient pressure to avoid static changes of the position of the coil assembly, i.e. interior and exterior static pressures must be balanced. The volume of air just described is, of course, in communication with that within the sack 100 through the passage 101, but because of the restriction of this passage only slow (static) conditions of change need be considered.

A piston 132 is in the form of a hollow cup and constitutes the rigid movable member of a diaphragm type device commercially known as a "Bellofram," the piston 132 being associated with a flexible rubber diaphragm of cup shape which freely folds upon itself as illustrated, the diaphragm being indicated at 134 with its outer edge 136 secured between the housing and a member 138 and so arranged as to extend upwardly within a clearance provided between the piston 132 and element 70, being then folded upon itself to extend across the lower face of the piston 132.

An annular member 140 is clamped between the upper end of element 72 and member 138 and has an opening 142 therein plugged by a suitable sealing means 144 and in alignment with an opening 146 in member 70 to provide access to the sealing means from the exterior of the housing. Member 140 serves to fixedly position member 138 and spring element 110 and provides a seal between the joining portions of the housing elements 70 and 72. Thus, the only passage between the air space surrounding the moving system within the housing and the air space interiorly of the sack 100 is the restricted passageway 101.

Another "Bellofram" comprising a piston 148 and diaphragm 152 is arranged in back-to-back relationship with the "Bellofram" comprising piston 132 and diaphragm 134, this assembly serving as the compensating piston assembly. Piston 148 is fixedly secured to piston 132 by a screw 150 which is tightened to clamp the central portion of a diaphragm 152 between cooperating shoulders 154 and 156 of pistons 132 and 148, respectively. The outer edge 158 of diaphragm 152 is secured between housing element 70 and annular member 160. Member 160 is clamped between a cup-shaped member 162 by the cap member 74. The upper end 164 of member 162 encloses the chamber 166 above the piston 148 and has a sealing plug 168 therein. A passage 170 through element 70 and member 160 provides communication between chamber 166 and the chamber between the housing and sack 100. Passage 170 terminates at a groove 171 in element 70 to avoid the possibility of passage 170 being closed by collapse of sack 100. A spring 172 is mounted in compression between member 162 and the upper end of piston 148. A restricted opening 174 in the side of piston 132 provides communication between the space between piston 132 and piston 148 and the clearance space between the side of piston 132 and the housing element 70. It will be apparent that the compensating piston assembly seals off an air space therein, this air space being initially at atmospheric pressure so that there is no tendency for change of volume in this sealed space during storage. The spring 172 biases the piston assembly downwardly. The piston 132 is constructed to have a greater effective area than the piston 148 so that the piston assembly will tend to move upwardly against the bias of spring 172 in response to pressure equalization on both sides of the piston assembly. The spring 172 is chosen so that as pressure changes are applied to the sack 100 to provide forces acting on the compensating piston assembly, the piston assembly may move so that whenever equilibrium is obtained between the forces exerted downwardly on the piston 148, i.e., the force of spring 172 and the force on piston 148, and the force exerted upwardly on the piston 132, the volume of the entire air space is constantly proportional to the external pressure. With changes of pressure due to lowering or raising of the hydrophone, this equilibrium is rapidly reached and substantially constantly maintained.

The hydrophone shown in FIGURE 3 will operate similarly to the hydrophone shown in FIGURE 1 to vary the active air space within the hydrophone housing in accordance with ambient pressure changes. Thus, an increase in the ambient pressure would tend to move sack 100 inwardly which will tend to increase the pressure of the air within the housing surrounding the moving coil system. There is also an increase in the pressure within chamber 126 in response to an increase in ambient pressure by reason of the piston 118 which is responsive to movement of diaphragm 120. Accordingly, there is an increase in the pressure acting on both pistons 132 and 148 and on the diaphragms 134 and 152, respectively associated therewith. The air contained within the piston assembly is compressed by flexure of the diaphragms 134 and 152 by reason of this pressure increase which is but a fraction of the ambient pressure change. The piston assembly is moved upwardly from a previous equilibrium position by the increase on the pressure acting on the pistons by reason of the greater effective area of the piston 132 to thereby increase the volume of the air surrounding the moving coil system. This movement of the piston assembly will compensate for the increased ambient pressure as was discussed with respect to the form of the invention shown in FIGURE 1.

Since various changes may be made in the construction and arrangement of parts without departing from the scope of the invention it is not desired to be limited except as required by the following claims.

What is claimed is:

1. A hydrophone comprising a housing, a pickup system within said housing comprising fixed and movable elements providing electrical output signals as the result of movements of the movable element under the action of pressure variations in liquid surrounding the hydrophone, means providing a flexible boundary separating the pickup system from surrounding liquid, means providing an air chamber surrounding said pickup system and bounded, in part, by said means providing a flexible boundary, means for applying to the air in said chamber a pressure substantially equal to the static pressure of liquid surrounding the hydrophone, and movable means forming a part of the boundary of said air chamber and maintaining a substantially constant ratio of the pressure within said air chamber to its volume, thereby to maintain substantially constant the stiffness of the air within said chamber irrespective of variations of pressure of said air.

2. A hydrophone according to claim 1 in which said means providing a flexible boundary includes a chamber filled with a liquid and means providing a restricted passage through which the last-mentioned liquid may flow during movement of said boundary to provide damping.

3. A hydrophone according to claim 1 in which said means for applying pressure to the air in said chamber comprises a flexible member subject to the pressure of liquid surrounding the hydrophone and bounding a second air chamber, and means providing a restricted passageway between the first and second air chambers.

4. A hydrophone according to claim 3 in which said flexible member is provided by a sack surrounding said housing.

5. A hydrophone according to claim 3 in which said flexible member is provided by a sack surrounding said housing.

5. A hydrophone according to claim 1 in which said movable means comprises a piston and a spring acting thereon against the air pressure in said chamber.

6. A hydrophone comprising a housing, a pickup system within said housing comprising fixed and movable elements providing electrical output signals as the result of movement of the movable element under the action of pressure variations in liquid surrounding the hydrophone, means providing a flexible boundary separating the pickup system from surrounding liquid, means providing an air chamber surrounding said pickup system and bounded, in part, by said means providing a flexible boundary, means for applying to the air in said chamber a pressure substantially equal to the static pressure of liquid surrounding the hydrophone, and movable means forming a part of the boundary of said air chamber and maintaining a substantially constant ratio of the pressure within said air chamber to its volume, thereby to maintain substantially constant the stiffness of the air within said chamber irrespective of variations of pressure of said air, said movable means comprising a pair of pistons, means connecting said pistons to define a sealed air space therebetween and a spring acting against one of said pistons to urge said movable means against the air pressure in said chamber.

7. A hydrophone according to claim 6 wherein the other of said pistons is responsive to the air pressure in said chamber.

References Cited by the Examiner

UNITED STATES PATENTS

| | | | |
|---|---|---|---|
| 1,563,626 | 12/1925 | Hecht et al. | 340—8 |
| 2,444,049 | 6/1948 | King | 340—8 |
| 2,490,595 | 12/1949 | Merten | 343—8 |
| 2,897,475 | 7/1959 | Harris | 340—8 |
| 2,977,573 | 3/1961 | Mott | 340—8 |
| 2,978,672 | 4/1961 | Barney | 340—8 |
| 3,000,216 | 9/1916 | Peters et al. | 340—8 |

CHESTER L. JUSTUS, *Primary Examiner.*